(12) United States Patent
Masubuchi et al.

(10) Patent No.: US 8,318,890 B2
(45) Date of Patent: Nov. 27, 2012

(54) POLYCARBONATE DIOL

(75) Inventors: Tetsuo Masubuchi, Tokyo (JP);
Eizaburou Ueno, Tokyo (JP); Yasuyuki Yoshioka, Tokyo (JP); Yasuyuki Tsukimori, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 34 days.

(21) Appl. No.: 11/795,376

(22) PCT Filed: Feb. 17, 2006

(86) PCT No.: PCT/JP2006/002869
§ 371 (c)(1),
(2), (4) Date: Jul. 17, 2007

(87) PCT Pub. No.: WO2006/088152
PCT Pub. Date: Aug. 24, 2006

(65) Prior Publication Data
US 2008/0146766 A1    Jun. 19, 2008

(30) Foreign Application Priority Data

Feb. 18, 2005 (JP) ............................. P.2005-041945

(51) Int. Cl.
*C08G 18/44* (2006.01)
*C07C 69/96* (2006.01)
*C07C 68/06* (2006.01)

(52) U.S. Cl. ............ 528/80; 528/85; 528/370; 558/260; 558/277

(58) Field of Classification Search .................. 528/370, 528/80, 85; 558/260, 277
See application file for complete search history.

(56) References Cited

U.S. PATENT DOCUMENTS

| 4,129,715 | A |   | 12/1978 | Chen et al. |         |
|-----------|---|---|---------|-------------|---------|
| 4,362,825 | A |   | 12/1982 | Grabhoefer et al. | |
| 4,978,691 | A |   | 12/1990 | Murai et al. |        |
| 5,310,827 | A | * | 5/1994  | Komiya et al. | 525/439 |
| 5,436,399 | A | * | 7/1995  | Koyama et al. | 528/59  |
| 7,005,495 | B2|   | 2/2006  | Konishi et al. |       |
| 2003/0176622 | A1 | * | 9/2003 | Konishi et al. | 528/196 |

FOREIGN PATENT DOCUMENTS

| CN | 1430637 A   | 7/2003  |
|----|-------------|---------|
| EP | 0 343 572 A2| 11/1989 |
| JP | 2-49025     | 2/1990  |
| JP | 4-1764      | 1/1992  |
| JP | 4-31430     | 2/1992  |
| JP | 5-29648     | 2/1993  |
| JP | 5-51428     | 3/1993  |
| JP | 5-339816    | 12/1993 |
| JP | 7-684       | 1/1995  |
| JP | 2003-183376 | 7/2003  |
| JP | 2004-35636  | 2/2004  |

OTHER PUBLICATIONS

Ralph Moore et al., "Novel co-polymer polycarbonate diols for polyurethane elastomer applications," Chemical Abstracts Service, Columbus, Ohio, US, XP002506391.
Office Action dated Aug. 21, 2009, received from the Chinese Patent Office for Chinese Patent Application No. 200680004853.6.

* cited by examiner

*Primary Examiner* — Rabon Sergent
(74) *Attorney, Agent, or Firm* — Finnegan, Henderson, Farabow, Garrett & Dunner, L.L.P.

(57) ABSTRACT

A polycarbonate diol which is useful as a raw material compound for producing a polycarbonate-based polyurethane having a sufficient mechanical strength and excellent in a balance of physical properties such as oil resistance, hydrolysis resistance, and weather resistance and which is amorphous. The polycarbonate diol includes repeating units of the below-shown formula (A) and the below-shown formula (B), wherein both terminal groups are hydroxyl groups, the ratio of the below-shown formula (A) to the below-shown formula (B) is 99:1 to 1:99 by mol, and number-average molecular weight is 300 to 10,000.

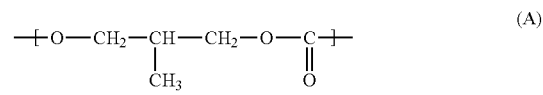

(A)

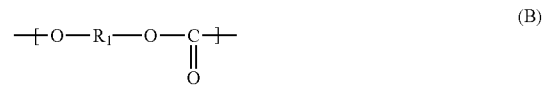

(B)

2 Claims, No Drawings ns>
POLYCARBONATE DIOL

TECHNICAL FIELD

The present invention relates to a novel polycarbonate diol which can provide a polyurethane excellent in a balance of physical properties such as oil resistance, flexibility, hydrolysis resistance, and weather resistance and having no tendency to crystallize.

BACKGROUND ART

Hitherto, as a soft segment for use in a polyurethane and a urethane-, ester- or amide-based thermoplastic elastomer, a polyester polyol and/or a polyether polyol, of which polymer terminal is a hydroxyl group, have been employed (e.g., see Patent Documents 1 and 2).

Of these, since a polyester polyol represented by a polyadipate polyol is poor in hydrolysis resistance, for example, the use of a polyurethane using the same is considerably limited since cracks may occur and mold may grow on the surface thereof within a relatively short period of time. On the other hand, a polyurethane using a polyether polyol has good hydrolysis resistance but the polyurethane has a disadvantage that it is poor in weather resistance and resistance to oxidative degradation. These disadvantages are, respectively, attributed to the presence of ester groups and ether groups in the polymer chains. With regard to a polyester- or polyamide-based thermoplastic elastomer, recently, highly enhanced thermal resistance, weather resistance, hydrolysis resistance, mold resistance, oil resistance, and the like have been demanded and hence the elastomer has problems similar to the case of the polyurethane.

In order to solve these problems, as a polyol component, a polycarbonate polyol, specifically a polycarbonate polyol of 1,6-hexanediol has been used since a carbonate bond in a polymer chain is extremely stable.

However, the polycarbonate polyol of 1,6-hexanediol is crystalline and hence is solid at normal temperature, so that there is a problem that handling thereof is difficult.

Moreover, in the case of using the polycarbonate polyol of 1,6-hexanediol as a soft segment of a polyurethane, the polyurethane has a disadvantage that flexibility and low-temperature properties are poor although hydrolysis resistance, weather resistance, resistance to oxidative degradation, heat resistance, and the like are improved. Namely, owing to large tendency to crystallize, the polyurethane using the polycarbonate polyol of 1,6-hexanediol has a problem that the soft segment component tends to cause crystallization hardening to impair elasticity and, in particular, recovery of elasticity at low temperature is remarkably lowered. Furthermore, the oil resistance is improved as compared with the polyether polyol but is still insufficient.

In order to solve these problems, various methods have been proposed.

For example, there has been disclosed an aliphatic copolycarbonate diol using 1,5-pentanediol and 1,6-hexanediol (e.g., see Patent Document 3). In this method, the resulting polycarbonate diol has, between carbonate bonds, a portion wherein an odd number of methylene groups are present. Thereby, structural regularity of the polycarbonate diol molecule is inhibited, crystallinity decreases, and further it becomes amorphous. However, even when the technology is applied, owing to its high viscosity, it is still insufficient in view of handling ability depending on the method employed.

Furthermore, there have been proposed thermoplastic polyurethanes which are produced using, as a soft segment, a copolymerized polycarbonate diol obtained from 1,6-hexanediol and 1,4-butanediol or 1,5-pentanediol (e.g., see Patent Documents 4 and 5). These thermoplastic polyurethanes are also remarkably excellent in flexibility in addition to the above properties of the thermoplastic polyurethane produced using as a soft segment the polycarbonate diol obtained from 1,6-hexanediol alone, and hence has attracted attention recently. However, as a result of investigation of the present inventors, the above thermoplastic polyurethanes produced using as a soft segment the copolymerized polycarbonate diol obtained from 1,6-hexanediol and 1,4-butanediol or 1,5-pentanediol have problems that a physical property balance between oil resistance and flexibility is insufficient and thus uses thereof are limited.

In addition, an aliphatic carbonate diol using 3-methyl-1,5-pentanediol is disclosed (e.g., see Patent Document 6). By introducing the structure having such a side chain, the structural regularity of the polycarbonate diol is disturbed and crystallinity is lowered. However, as a result of investigation of the present inventors, a thermoplastic polyurethane produced using as a soft segment the above polycarbonate diol obtained from 3-methyl-1,5-pentanediol has a problem that oil resistance is insufficient although an improvement in flexibility is observed.

As copolymerized polycarbonate diols other than the above ones, there have been disclosed one using 1,6-hexanediol and trimethyl-1,6-hexanediol (see Patent Document 7) and one using 1,9-nonanedol and 2-methyl-1,8-octanediol (see Patent Document 8). When they are converted into thermoplastic polyurethanes, there are problems that oil resistance and flexibility are still insufficient in the former case and oil resistance is insufficient although flexibility is improved in the latter case. Moreover, there also a problem that the diols as raw materials are not easily available in both cases.

The polycarbonate diol of the invention contains 5-methyl-1,3-dioxane-2-one as an impurity. In the case that the amount of the impurity is large, as a result of investigation of the present inventors, it has been found that hydrolysis resistance is particularly lowered when the diol is converted into a thermoplastic polyurethane. On the other hand, there has been disclosed a process for producing a polytrimethylene carbonate diol having a similar structure (Patent Document 9). In Production Examples thereof, it is disclosed that 3% or less of 1,3-dioxan-2-one is contained as an impurity but the impurity does not affect weather resistance and hydrolysis resistance when the diol is converted into a thermoplastic polyurethane even in the case where the amount is large, unlike the impurity of the invention, and only exerts an influence of lowered yield of the polycarbonate diol.

Patent Document 1: U.S. Pat. No. 4,362,825
Patent Document 2: U.S. Pat. No. 4,129,715
Patent Document 3: JP-B-5-29648
Patent Document 4: JP-A-5-51428
Patent Document 5: JP-B-7-684
Patent Document 6: JP-B-4-1764
Patent Document 7: JP-A-2-49025
Patent Document 8: JP-A-5-339816
Patent Document 9: JP-A-2004-35636

DISCLOSURE OF THE INVENTION

Problems that the Invention is to Solve

An object of the present invention is to provide a novel polycarbonate diol which is useful as a raw material compound for producing a polycarbonate-based polyurethane excellent in a balance of physical properties such as oil resistance, flexibility, hydrolysis resistance, and weather resistance and which is amorphous.

Means for Carrying Out the Invention

As a result of extensive investigation, the present inventors have found that a polycarbonate diol comprising repeating units of the below-shown formula (A) and the below-shown formula (B), wherein both terminal groups are hydroxyl groups, the ratio of the below-shown formula (A) to the below-shown formula (B) is 99:1 to 1:99 by mol, and the number-average molecular weight thereof is 300 to 10,000, is amorphous and, when it is applied to polyurethanes or other thermoplastic elastomers, a balance of physical properties is remarkably excellent as compared with those using conventional polycarbonate polyols. Thus, they have accomplished the invention. Namely, the invention provides the following.

1. A polycarbonate diol comprising repeating units of the below-shown formula (A) and the below-shown formula (B), wherein both terminal groups are hydroxyl groups, the ratio of the below-shown formula (A) to the below-shown formula (B) is 99:1 to 1:99 by mol, and the polycarbonate diol has a number-average molecular weight of 300 to 10,000:

[Chemical Formula 1]

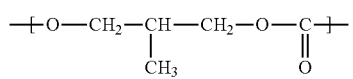

(A)

[Chemical Formula 2]

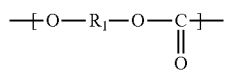

(B)

wherein R1 represents an alkylene group having 2 to 20 carbon atoms excluding an alkylene group derived from 2-methyl-1,3-propanediol.

2. The polycarbonate diol according to above item 1, wherein the ratio of the repeating unit of the above formula (A) to the repeating unit of the above formula (B) is 80:20 to 20:80 by mol.

3. The polycarbonate diol according to above item 1, wherein the ratio of the repeating unit of the above formula (A) to the repeating unit of the above formula (B) is 70:30 to 30:70 by mol.

4. The polycarbonate diol according to any one of above items 1 to 3, wherein the repeating unit of the above formula (B) is a repeating unit represented by the following formula (C):

[Chemical Formula 3]

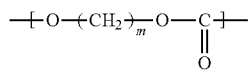

(C)

wherein m represents an integer of 2 to 10.

5. The polycarbonate diol according to any one of above items 1 to 3, wherein the repeating unit of the above formula (B) comprises at least one of repeating units represented by the following formulae (D), (E), and (F):

[Chemical Formula 4]

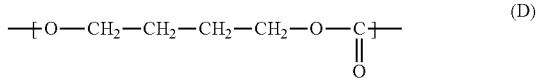

(D)

[Chemical Formula 5]

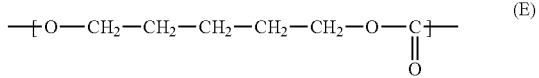

(E)

[Chemical Formula 6]

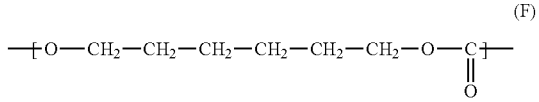

(F)

6. The polycarbonate diol according to any one of above items 1 to 5, wherein the content of 5-methyl-1,3-dioxan-2-one is 0.1 to 5% by weight.

7. The polycarbonate diol according to any one of above items 1 to 6, which contains a repeating unit comprising a compound having three or more hydroxyl groups in one molecule and wherein the ratio of the repeating unit to the total of the repeating units of the above formulae (A) and (B) is 0.1:99.9 to 5:95% by mol.

8. A thermoplastic polyurethane obtained using the polycarbonate diol according to any one of above items 1 to 7 as a raw material.

9. A process for producing the polycarbonate diol according to above item 6, comprising performing distillation so that the content of 5-methyl-1,3-dioxan-2-one is reduced to 5% by weight or less.

Advantage of the Invention

According to the invention, there can be provided a novel polycarbonate diol which can produce a polyurethane excellent in a balance of physical properties such as oil resistance, flexibility, hydrolysis resistance, and weather resistance and having no tendency to crystallize and which is amorphous.

BEST MODE FOR CARRYING OUT THE INVENTION

The following will describe the present invention in detail. The polycarbonate of the invention is synthesized from a diol containing the below-shown formula (G) and the below-shown formula (H) as main components and optionally a small amount of a polyol.

[Chemical Formula 7]

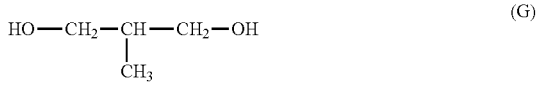

(G)

[Chemical Formula 8]

(H)

wherein R1 represents an alkylene group having 2 to 20 carbon atoms excluding an alkylene group derived from 2-methyl-1,3-propanediol.

As a result of investigation, the present inventors have found that, only when the diol represented by the above formula (G), i.e., 2-methyl-1,3-propanediol is used, an effect of disturbing the structural regularity of the polycarbonate diol becomes high and an amorphous polycarbonate diol which can produce a polyurethane excellent in physical properties such as oil resistance and flexibility as compared with the polycarbonate diol using conventional 1,6-hexanediol alone and having no crystallizing tendency can be provided when it is copolymerized with the diol represented by the above formula (H), e.g., 1,4-butanediol, 1,6-hexanediol, or the like. On the other hand, in the case of using a diol having a side chain such as 3-methyl-1,5-pentanediol instead of the above formula (G), a polycarbonate diol having a sufficient performance is not obtained. Although the reason why such a difference occurs is not clear, it seems to be attributed to the facts that 3-methyl-1,5-pentanediol has a main chain length longer than 2-methyl-1,3-propanediol has and thus the disturbance of the structural regularity caused by the side chain part hardly affects a terminal part of the main chain.

Moreover, the present inventors have found a surprising fact that, when a polycarbonate diol is formed using 2-methyl-1,3-propanediol alone without using the diol represented by the above formula (H), flexibility, i.e., elongation at a coated film state, of the polyurethane produced using the polycarbonate diol is not sufficient. In general, in the structure of a polyurethane, a polycarbonate diol acts as a soft segment but, when the polycarbonate diol is composed of 2-methyl-1,3-propanediol alone, only the effect of disturbing the structural regularity does not exhibit a sufficient flexibility. On the other hand, a polyurethane excellent in flexibility is obtained when the diol represented by the above formula (H) is copolymerized in only a small amount, together with 2-methyl-1,3-propanediol, as a constitutional component of the polycarbonate diol.

Specific examples of the diol represented by the above formula (H) for use in the invention include ethylene glycol, 1,3-propanediol, neopentyl glycol, 1,4-butanediol, 2-isopropyl-1,4-butanediol, 1,5-pentanediol, 3-methyl-1,5-pentanediol, 2,4-dimethyl-1,5-pentanediol, 2,4-diethyl-1,5-pentanediol, 1,6-hexanediol, 2-ethyl-1,6-hexanediol, 1,7-heptanediol, 1,8-octanediol, 2-methyl-1,8-octanediol, 1,9-nonanediol, 1,10-decanediol, 1,3-cyclohexanediol, 1,4-cyclohexanediol, 1,4-cyclohexanedimethanol, 2-bis(4-hydroxycyclohexyl)-propane, and the like. The diol represented by the formula (H) may be used only one kind or may be used in combination of two or more kinds thereof. At industrial production, it is preferred to use a linear alkylene diol having 2 to 10 carbon atoms in view of easy availability. Of these, the use of 1,4-butanediol, 1,5-pentanediol, and/or 1,6-pentanediol is particularly preferred since a polyurethane more excellent in a balance of physical properties such as oil resistance, flexibility, hydrolysis resistance, and weather resistance is obtained.

In the novel polycarbonate diol of the invention, the ratio (molar ratio) of the above formula (G) to the above formula (H) is 99:1 to 1:99. It is preferably 80:20 to 20:80, more preferably 70:30 to 30:70.

Moreover, in the invention, other than the above formula (G) and the above formula (H), a polycarbonate diol polyfunctionalized by using a compound having three or more hydroxyl groups in one molecule, such as trimethylolethane, trimethylolpropane, hexanetriol, or pentaerythritol in a small amount is also included.

When the compound having three or more hydroxyl groups in one molecule is used too much, gelation may occur through crosslinking during the conversion into a polycarbonate. When the amount is too small, the effect of polyfunctionalization is insufficient. Therefore, the compound having three or more hydroxyl groups in one molecule is preferably used in an amount of 0.1 to 5% by mol relative to the total mol number of the diols of the above formulae (G) and (H). More preferably, the amount is 0.1 to 2% by mol.

The range of the average molecular weight of the polycarbonate diol of the invention is usually number-average molecular weight of 300 to 10,000. When the number-average molecular weight is less than 300, flexibility and low-temperature properties of the resulting thermoplastic polyurethane become poor in many cases. When it exceeds 10,000, molding ability of the resulting thermoplastic polyurethane decreases in many cases. Thus, the cases are not preferred. Preferably, the number-average molecular weight is in the range of 400 to 8,000. More preferably, it is 500 to 5,000.

The polycarbonate diol having a hydroxyl group at the terminal according to the invention is a novel polymer and can be obtained by subjecting the diols represented by the formulae (G) and (H) to transesterification with a carbonate ester.

The carbonate ester for use in the invention includes alkylene carbonates, dialkyl carbonates, diaryl carbonates, and the like. The alkylene carbonates include ethylene carbonate, trimethylene carbonate, 1,2-propylene carbonate, 5-methyl-1,3-dioxane-2-one, 1,2-butylene carbonate, 1,3-butylene carbonate, 1,2-pentylene carbonate, and the like. Moreover, dialkyl carbonates include dimethyl carbonate, diethyl carbonate, di-n-butyl carbonate, and the like and the diaryl carbonates include diphenyl carbonate. Of these, in view of reactivity and easy availability, the use of ethylene carbonate, dimethyl carbonate, diethyl carbonate, and di-n-butyl carbonate are preferred. Of these, the use of ethylene carbonate is more preferred. Namely, in the transesterification reaction between the diols represented by the above formulae (G) and (H) and ethylene carbonate, there is an advantage that there can be obtained a polycarbonate wherein substantially all the terminal groups are hydroxyl groups.

The reaction for obtaining the polycarbonate diol of the invention is not particularly limited and any known methods can be used. As one example of the process for producing the polycarbonate diol of the invention, the following will explain a process comprising a first step of carrying out a transesterification reaction between the diols represented by the above formulae (G) and (H) and a carbonate ester to obtain a polycarbonate prepolymer and a second step of self-condensation of the resulting polycarbonate prepolymer to obtain the polycarbonate diol of the invention.

In the first step, the transesterification reaction between the diols represented by the above formulae (G) and (H) and a carbonate ester is a main reaction. As the transesterification reaction proceeds, a compound containing a hydroxyl group is eliminated from the carbonate ester (hereinafter, the compound is referred to as hydroxyl group-containing by-product). Since the transesterification reaction is an equilibrium reaction, the polymerization does not sufficiently proceed when the hydroxyl group-containing by-product is accumulated in the reaction system. Therefore, it is preferred to carrying out the polymerization reaction while the hydroxyl group-containing by-product is removed to outside of the reaction system.

More specifically, the transesterification reaction in the first step is preferably carried out while a vapor containing the hydroxyl group-containing by-product formed in the reaction is generated, the vapor is condensed to form a condensed liquid, and at least a part of the condensed liquid is removed to outside of the reaction system. The production of the polycarbonate diol of the invention may be conducted under normal pressure or under reduced pressure but is preferably conducted under reduced pressure in order to facilitate the generation of the vapor containing the hydroxyl group-containing by-product. On this occasion, in order to remove the hydroxyl group-containing by-product efficiently, a method of introducing an inert gas having no adverse effect on the polymerization reaction, such as helium, argon, nitrogen, carbon dioxide, or a lower hydrocarbon gas and removing the hydroxyl group-containing by-product along with these gases may be used in combination.

On this occasion, it is preferred to use a rectification column having a sufficient separation performance for the purpose of suppressing distillation of the diols represented by the above formulae (G) and (H) and the carbonate ester and efficiently removing the hydroxyl group-containing by-product.

Furthermore, in the invention, a part of 2-methyl-1,3-propanediol bonded to the terminal of the polycarbonate prepolymer is eliminated as 5-methyl-1,3-dioxan-2-one which is a cyclic carbonate. Since the compound is an effective component, i.e., a raw material of the present reaction, it is important to suppress the elution in the first step.

Namely, in the case of using a rectification column, the separation performance of the rectification column is of importance and a rectification column having a theoretical plate number of 5 plates or more, preferably 7 plates or more is employed. Also, a settable reflux ratio varies depending on the potency of the rectification column used but the ratio is usually set at 3 to 15, preferably at 3 to 12. Moreover, when a vaporizing amount is small, a rate of removing the hydroxyl group-containing by-product decreases and thus a reaction time increases. On the other hand, when the vaporizing amount is too large, the diols represented by the above formulae (G) and (H) and the carbonate ester, 5-methyl-1,3-dioxan-2-one are distilled out and hence productivity decreases. Therefore, it is preferred to increase the vaporizing amount in a range where the productivity does not decrease. A appropriate control of the reflux ratio and the vaporizing amount is extremely preferred since the reaction can be carried out within a short period of time and the productivity is enhanced as well as a time for which the reaction mixture undergoes thermal history is shortened and quality deterioration induced by a side reaction is suppressed.

The reaction temperature in the first step is usually 120° C. to 180° C. Preferably, it is 130° C. to 170° C. When the temperature is lower than 120° C., the reaction rate of the transesterification is low and the reaction time increases, so that the case is not preferred. On the other hand, when the temperature exceeds 180° C., side reactions cannot be neglected and thus productivity may decrease or the physical properties of the product are adversely affected, so that the case is not preferred. As the side reactions, the following may be mentioned, for example. 2-Methyl-1,3-propanediol bonded to the terminal of the polycarbonate prepolymer is eliminated as 5-methyl-1,3-dioxan-2-one. In the case of using 1,4-butanediol as the above formula (H), 1,4-butanediol bonded to the terminal of the polycarbonate prepolymer is eliminated as a cyclic ether (tetrahydrofuran). Moreover, in the case of using ethylene carbonate as a carbonate ester, ethylene carbonate is decomposed into ethylene oxide and carbon dioxide by heat. When the ethylene oxide reacts with the terminal hydroxyl group of the polycarbonate prepolymer, a polycarbonate diol containing an ether bond is obtained and a thermoplastic polyurethane produced using the polycarbonate diol containing a large amount of such an ether bond as a raw material becomes poor in heat resistance and weather resistance.

The carbonate prepolymer obtained in the first step usually has a polymerization degree of about 2 to 10. The polymerization degree is controlled by controlling the amount of the hydroxyl group-containing by-product to be removed from the reaction system.

Usually, the reaction mixture obtained in the first step is subjected to the self-condensation in the second step without purification. The reaction mixture contains unreacted raw materials in many cases but they are removed at the start or an early stage of the second step. However, in the invention, 5-methyl-1,3-dioxan-2-one is present in the reaction mixture. Since the boiling point of the substance is higher than that of 2-methyl-1,3-propnaediol, the removal is difficult under usual conditions. The 5-methyl-1,3-dioxan-2-one is gradually formed even when the reaction temperature of the first step is lowered to decrease the production amount and is accumulated in the reaction system. This is because 2-methyl-1,3-propanediol bonded to the polycarbonate diol is rich in reactivity and hence the cyclic carbonate as mentioned above is formed. For example, in the case of using 1,3-propanediol, the amount of 1,3-dioxan-2-one produced is small as compared with the case of the 5-methyl-1,3-dioxan-2-one of the invention. In the case of using 1,4-butanediol, a cyclic carbonate is unstable and the formation of tetrahydrofuran as a side reaction is predominant.

Therefore, at the removal of the unreacted raw materials at an early stage of the second step, it is necessary to remove 5-methyl-1,3-dioxan-2-one simultaneously. However, since 5-methyl-1,3-dioxan-2-one is an effective component of the reaction, i.e., a raw material, it is important to appropriately regulate an amount thereof to be removed. Namely, when the amount of 5-methyl-1,3-dioxan-2-one to be removed is too large, an amount of the polycarbonate diol to be produced per batch decreases and thus productivity decreases. On the other hand, when the amount to be removed is too small, the concentration of 5-methyl-1,3-dioxan-2-one in the reaction mixture becomes high and a remaining amount thereof in the resulting polycarbonate diol increases, so that various adverse effects may result in. An appropriate amount to be removed varies depending on the content of 2-methyl-1,3-propnaediol in the diol used as a raw material but, in general, preferred is an amount to be removed, which may result in a concentration thereof of 25% by weight or less in the reaction mixture. This is because 5-methyl-1,3-dioxan-2-one is consumed in the second step when the concentration falls within such a range, the concentration in the polycarbonate diol becomes sufficiently low, and thus the compound does not exert adverse effects. When the concentration is too high, it takes too much time to consume 5-methyl-1,3-dioxan-2-one in the second step, so that an non-negligible amount thereof remains in the resulting polycarbonate diol in many cases.

As a method for removing the unreacted raw materials at an early stage of the second step, it is preferred to conduct the removal under reduced pressure using a rectification column as in the case of the first step. In the case of using a rectification column, the separation performance of the rectification column is of importance and a rectification column having a theoretical plate number of 5 plates or more, preferably 7 plates or more is employed. Also, a settable reflux ratio varies depending on the potency of the rectification column used but the ratio is usually set at 0.5 to 3. Moreover, when a vaporizing amount is small, the removal of 5-methyl-1,3-dioxan-2-one is insufficient and thus it may remain in the reaction mixture in a large amount. On the other hand, when the vaporizing amount is too large, the productivity of 5-methyl-1,3-dioxan-2-one decreases. Therefore, it is extremely preferred to appropriately control the reflux ratio and the vaporizing amount in a range where the productivity does not decrease.

Since a liquid containing the unreacted diols, carbonate ester, and 5-methyl-1,3-dioxan-2-one removed at an early stage of the second step can be used as raw materials, recycled use thereof is preferred.

In the second step, the polycarbonate prepolymer obtained in the first step is subjected to self-condensation of the resulting polycarbonate prepolymer to obtain the polycarbonate diol of the invention. As the self-condensation reaction proceeds, the diols represented by the above formulae (G) and (H) are eliminated from the terminal of the polycarbonate prepolymer. Since the reaction is an equilibrium reaction as in the first step, the polymerization does not sufficiently proceed when the diols are accumulated in the reaction system. Therefore, the second step is also usually carried out while the diols are removed to outside of the reaction system under reduced pressure. In order to efficiently remove the diols, it is preferred to remove the vapor as it is to outside of the reaction system without using the rectification column, unlike the first step. In addition, a thin-film evaporator can be also employed.

The reaction temperature in the second step is usually 120° C. to 200° C. Preferably, it is 130° C. to 190° C. When the temperature is lower than 120° C., the reaction rate of the self-condensation is low and the reaction time increases, so that the case is not preferred. On the other hand, when the temperature exceeds 200° C., decomposition of the polycarbonate prepolymer cannot be neglected and thus productivity may decrease, so that the case is not preferred. In the second step, since the unreacted carbonate ester is hardly present in the reaction system, a side reaction of forming the ether bond as mentioned above occurs only a little, so that it is possible to elevate the reaction temperature as compared with the case of the first step.

In the invention, at the transesterification reaction, a catalyst can be used when it is intended to facilitate the reaction. Examples of the catalyst may include metals such as lithium, sodium, potassium, rubidium, cesium, magnesium, calcium, strontium, barium, titanium, zirconium, hafnium, cobalt, zinc, aluminum, germanium, tin, lead, antimony, arsenic, and cerium and compounds thereof. As the metallic compounds, oxides, hydroxides, salts, alkoxides, organic compounds, and the like may be mentioned. Of these catalysts, it is preferred to use titanium compounds such as tetraisopropoxytitanium and tetra-n-butoxytitanium, tin compounds such as di-n-butyltin dilaurate, di-n-butyltin oxide, and dibutyltin diacetate, lead compounds such as lead acetate and lead stearate. When the amount of the catalyst is too small, the effect of addition of the catalyst is not obtained. On the other hand, when the amount of the catalyst is too large, the remaining catalyst in the polycarbonate diol frequently acts as a catalyst in the synthesis of a thermoplastic elastomer and hence, an unexpected reaction and/or difficult control of the reaction may result in decrease in physical properties of the thermoplastic elastomer. In order to avoid such decrease in physical properties, it is preferred to use the catalyst in an amount of 1 to 10,000 ppm relative to the total charged weight of the raw materials. More preferably, the catalyst is used in an amount of 1 to 1,000 ppm.

The polycarbonate diol of the invention contains 5-methyl-1,3-dioxan-2-one as mentioned above. When the amount of 5-methyl-1,3-dioxan-2-one is large, the following adverse effects may be exerted on the polycarbonate diol of the invention. The contamination of 5-methyl-1,3-dioxan-2-one results in decrease of the viscosity of the polycarbonate diol and hence it becomes difficult to determine a polymerization degree from the viscosity. Moreover, at the production of the thermoplastic polyurethane, the remaining 5-methyl-1,3-dioxan-2-one may exude onto the surface of the polyurethane and thus a tack-free property thereof may be lowered.

Furthermore, decomposition of the remaining 5-methyl-1,3-dioxan-2-one in the thermoplastic polyurethane through contact with water may cause decrease in physical properties of the thermoplastic polyurethane. Namely, water resistance and weather resistance of the polyurethane decrease. The decrease in physical properties is attributed to instability of 5-methyl-1,3-dioxan-2-one as compared with the same kind of compounds, which is a phenomenon characteristic to the invention. When compared with 1,3-dioxan-2-one having the same 6-membered ring structure, 5-methyl-1,3-dioxan-2-one is more instable and richer in reactivity and hence there is a case where only the polycarbonate diol containing 5-methyl-1,3-dioxan-2-one adversely influences physical properties even when the contents thereof in the polycarbonate diols are the same. In order to avoid such an influence, it is important to limit the content of 5-methyl-1,3-dioxan-2-one in the polycarbonate diol to a certain amount or less.

On the other hand, as a lower limit of the content of 5-methyl-1,3-dioxan-2-one, the lesser the better. However, when the lower limit is too low, a time required for the production becomes too long and hence the case is not suitable as an actual method.

Therefore, the amount of 5-methyl-1,3-dioxan-2-one relative to the polycarbonate diol is preferably 0.1 to 5% by weight. More preferably, the amount is 0.5 to 5% by weight.

As a result of investigation of the present inventors, it has been found that various preferable effects are exhibited when the content of 5-methyl-1,3-dioxan-2-one falls within the above range. For example, when the polycarbonate diol is converted into a thermoplastic polyurethane, there are mentioned preferable effects that flexibility is improved, fluidity at injection molding is improved to enhance processing ability, surface smoothness and glossiness are enhanced when it is molded into a sheet shape, and flexibility is not impaired even at low temperature and thus low-temperature properties are improved. One reason for exhibiting such effects is considered that 5-methyl-1,3-dioxan-2-one acts as a plasticizer. As examples where a cyclic carbonate acts as a plasticizer, ethylene carbonate and propylene carbonate are known but 5-methyl-1,3-dioxan-2-one has an advantage that it has a high boiling point and thus weight loss thereof is small even when it is exposed to high temperature at the molding of the polyurethane.

The thermoplastic polyurethane can be obtained by reacting the polycarbonate diol of the invention thus obtained with a polyisocyanate. The thermoplastic polyurethane of the invention is excellent in a balance of physical properties such as oil resistance, flexibility, hydrolysis resistance, and weather resistance and is an extremely useful material as a raw material for various moldings.

Examples of the polyisocyanate for use in the production of the thermoplastic polyurethane of the invention include known aromatic diisocyanates such as 2,4-tolylene diisocyanate, 2,6-tolylene diisocyanate, and a mixture thereof (TDI), crude TDI, diphenylmethane-4,4'-diisocyanate (MDI), crude MDI, naphthalene-1,5-diisocyanate (NDI), 3,3'-dimethyl-4,4'-biphenylene diisocyanate, polymethylenepolyphenyl isocyanate, xylylene diisocyanate (XDI), and phenylene diisocyanate; known aliphatic diisocyanates such as 4,4'-methylene-biscyclohexyl diisocyanate (hydrogenated MDI), hexamethylene diisocyanate (HMDI), isophorone diisocyanate (IPDI) and cyclohexane diisocyanate (hydrogenated XDI); and isocyanurate-modified products, carbodimidemodified products, and biuret-modified products of these isocyanates. These polyisocyanates may be used solely or may be used as a combination of two or more thereof.

Moreover, in the production of the thermoplastic polyurethane of the invention, if desired, a chain extender may be used as a copolymerizable component. As the chain extender, there may be employed a customary chain extender used in a polyurethane industry, i.e., water, a low-molecular-weight polyol, a polyamine, or the like. For example, the chain extender is a low-molecular-weight polyol such as ethylene glycol, 1,3-propanediol, 1,4-butanediol, 1,5-pentanediol, 1,6-hexanediol, neopentyl glycol and 1,10-decanediol, 1,1-cyclohexanedimethanol, 1,4-cyclohexanedimethanol, xylylene glycol, bis(p-hydroxy)diphenyl, or bis(p-hydroxyphenyl)propane; a polyamine such as ethylenediamine, hexamethylenediamine, isophoronediamine, xylylenediamine, diphenyldiamine, or diaminodiphenylmethane. These chain extenders may be used solely or may be used as a combination of two or more thereof.

As a process for producing the thermoplastic polyurethane of the invention, a urethane-forming technique known in a polyurethane industry may be employed. For example, the polycarbonate diol of the invention is reacted with a polyisocyanate in the range of room temperature to 200° C. to form the thermoplastic polyurethane of the invention.

In addition, a thermoplastic polyurethane can be produced using the polycarbonate diol of the invention, a polyisocyanate, and further, if necessary, a chain extender. In the case of using a chain extender, the polycarbonate diol of the invention is first reacted with a polyisocyanate under a condition of the presence of the polyisocyanate excessive in molar equivalent in the range of room temperature to 200° C. to form a urethane prepolymer having an isocyanate terminal. The urethane prepolymer is converted into a higher-molecular-weight product by adding the chain extender to obtain a target thermoplastic polyurethane.

In these reactions, a known polymerization catalyst including as a representative a tertiary amine and an organic salt of a metal, e.g., tin or titanium may be employed.

These reactions may be also carried out in a solvent. Preferred solvents include dimethylformamide, diethylformamide, dimethylacetamide, dimethylsulfoxide, tetrahydrofuran, methyl isobutyl ketone, dioxane, cyclohexanone, benzene, toluene, ethyl cellosolve, and the like.

In the thermoplastic polyurethane of the invention, it is desired to use at least a heat stabilizer and a light stabilizer as additives. As the heat stabilizer, there may be used an aliphatic, aromatic or alkyl group-substituted aromatic ester of phosphoric acid or phosphorous acid; a hypophosphorous acid derivative; a phosphorus compound such as phenylphosphonic acid, phenylphosphinic acid, diphenylphosphonic acid, polyphosphonate, dialkylpentaerythritol diphosphite, and a dialkylbisphenol A diphosphite; a phenol-based derivative, especially, a hindered phenol compound; a sulfur-containing compound such as a thioether type, dithioacid salt type, mercaptobenzimidazole type, or thiocarbanilide type compound, or a thiodipropionic acid ester; or a tin-based compound such as tin malate or dibutyltin monooxide. The hindered phenol compound is preferably Irganox 1010 (trade name: manufactured by CIBA-GEIGY), Irganox 1520 (trade name: manufactured by CIBA-GEIGY), or the like. As a phosphorus-based compounds used as a secondary antiaging agent, PEP-36, PEP-24G, and HP-10 (each being a trade name: each manufactured by ASAHI DENKA K.K.) and Irgafos 168 (trade name: manufactured by CIBA-GEIGY) are preferred. Furthermore, as a sulfur compound, a thioether compound such as dilaurylthiopropionate (DLTP) or distearylthiopropionate (DSTP) is preferred. The light stabilizer includes a benzotriazole-based compound, a benzophenone-based compound, and the like. Moreover, a radical scavenger type light stabilizer such as a hindered amine compound is also suitably used.

These stabilizers may be used solely or as a combination of two or more thereof. The amount of these stabilizers to be added is 0.01 to 5 parts by weight, preferably 0.1 to 3 parts by weight, more preferably 0.2 to 2 parts by weight relative to 100 parts by weight of the thermoplastic polyurethane.

Furthermore, if necessary, a plasticizer may be added to the thermoplastic polyurethane of the invention. Examples of such a plasticizer include phthalic esters such as dioctyl phthalate, dibutyl phthalate, diethyl phthalate, butyl benzyl phthalate, di-2-ethylhexyl phthalate, diisodecyl phthalate, diundecyl phthalate, and diisononyl phthalate; phosphoric esters such as tricresyl phosphate, triethyl phosphate, tributyl phosphate, tri-2-ethylhexyl phosphate, trimethylhexyl phosphate, tris-chloroethyl phosphate, and tris-dichloropropyl phosphate; fatty acid esters such as octyl trimellitate, isodecyl trimellitate, trimellitic esters, dipentaerythritol esters, dioctyl adipate, dimethyl adipate, di-2-ethylhexyl azelate, dioctyl azelate, dioctyl sebacate, di-2-ethylhexyl sebacate, and methylacetyl ricinoleate; pyromellitic esters such as octyl pyromellitate; epoxy-based plasticizers such as epoxidized soybean oil, epoxidized linseed oil, and epoxidized fatty acid alkyl ester; polyether-based plasticizers such as adipic ether ester and polyether; liquid rubbers such as liquid NBR, liquid acrylic rubber, and liquid polybutadiene; non-aromatic paraffin oil, and the like.

These plasticizers may be used solely or as a combination of two or more thereof. The amount of the plasticizer to be added is appropriately chosen in accordance with the required hardness and physical properties but the amount is preferably 0 to 50 parts by weight relative to 100 parts by weight of the thermoplastic polyurethane.

In addition, an inorganic filler, a lubricant, a colorant, a silicone oil, a foaming agent, a flame retardant, and the like may be added to the thermoplastic polyurethane of the invention. Examples of the inorganic filler include calcium carbonate, talc, magnesium hydroxide, mica, barium sulfate, silicic acid (white carbon), titanium oxide, carbon black, and the like.

The polycarbonate diol of the invention can be used as a raw material for the thermoplastic polyurethane of the invention and further as a raw material for thermoplastic elastomers, urethane elastic fiber spandex moldings, spandex yarn, and the like, as a constitutional material for coatings, adhesives, and the like, or as a polymer plasticizer. Also, the thermoplastic polyurethane of the invention has flexibility comparable to polyether-based thermoplastic polyurethanes and can be used as a material for various moldings.

EXAMPLES

Hereinafter, the present invention will be described in more detail with reference to Examples and the like but these examples should not be construed as limiting the scope of the invention.

In the Examples and Comparative Examples, with regard to various physical properties of the polycarbonate diol and polyurethane film, tests were conducted in accordance with the following test methods <Test Methods>

1. OH Value

An acetylating agent was prepared by diluting 12.5 g of acetic anhydride with 50 ml of pyridine. A sample was precisely weighed into a 100 ml eggplant-shape flask in an amount of 2.5 to 5.0 g. After 5 ml of the acetylating agent and 10 ml of toluene were added through a whole pipette, a cooling tube was fitted to the flask and the whole was stirred and heated at 100° C. for 1 hour. Then, 2.5 ml of distilled water was added through a whole pipette and the whole was further heated and stirred for another 10 minutes. After cooling for 2 to 3 minutes, 12.5 ml of ethanol was added. After 2 or 3 drops of phenolphthalein were added as an indicator, the mixture was titrated with 0.5 mol/l ethanolic potassium hydroxide. Into a 100 ml eggplant-shape flask were charged 5 ml of the acetylating agent, 10 ml of toluene, and 2.5 ml of distilled water, the whole was heated and stirred for 10 minutes and then titration was conducted in a similar manner (blank test). Based on the results, an OH value was calculated according to the following numerical formula (I).

$$\text{OH value (mg-KOH/g)} = \{(b-a) \times 28.05 \times f\}/e \quad (i)$$

a: titer of sample (ml)
b: titer at blank test (ml)
e: sample weight (g)
f: factor of titration liquid 2. Molecular Weight The terminals of the polymers in Examples and Comparative Examples were substantially all found to be hydroxyl groups upon measurement of 13C-NMR (270 MHz). Furthermore, acid values in the polymers were measured by titration with KOH and were found to be 0.01 or less in all the polymers of Examples and Comparative Examples. Therefore, the number-average molecular weight of the resulting polymer is determined by the following formula (II).

$$\text{Number-average molecular weight} = 2/(\text{OH value} \times 10^{-3}/56.11) \quad (ii)$$

3. Copolymerization Composition

The copolymerization composition of the polycarbonate diol of the invention was measured as follows.

Into a 100 ml eggplant-shape flask was charged 1 g of a sample, and then 30 g of ethanol and 4 g of potassium hydroxide were added thereto, followed by 1 hour of a reaction at 100° C. After cooling to room temperature, 2 to 3 drops of phenolphthalein were added as an indicator and the whole was neutralized with hydrochloric acid. After cooling for 1 hour in a refrigerator, a precipitated salt was removed by filtration and a product was analyzed by gas chromatography. The analysis was conducted using a gas chromatograph GC-14B (manufactured by Shimadzu Corporation) fitted with DB-WAX (manufactured by J&W) as a column, diethylene glycol diethyl ester as an internal standard, and FID as a detector. In this connection, a temperature-elevating profile of the column is as follows: the column was kept at 60° C. for 5 minutes and the temperature was elevated to 250° C. at a rate of 10° C./min.

4. Mechanical Properties

A polyurethane film having a thickness of 0.07 to 0.10 mm was formed and the film was cut into strips having a size of 10 mm×80 mm. A strip which was aged in a constant-temperature chamber at 23° C. under 50% RH for 1 day was used as a test piece.

On the test piece, 100% tensile stress (MPa) (stress at the time when the coated film was elongated by 50 mm) and elongation of the coated film (%) were measured at a chuck distance of 50 mm and a tensile rate of 100 mm/min using a tensilon tensile tester RTC-1250A manufactured by ORIENTEC) in a constant-temperature chamber at 23° C. under 50% RH.

5. Oil Resistance

A polyurethane film having a thickness of 0.07 to 0.10 mm was formed and the film was immersed in oleic acid at 45° C. for 1 week and then a swelling ratio was measured, the ratio being used as an index of oil resistance. The swelling ratio was determined using the following formula (iii).

$$\text{Swelling ratio} = (\text{weight after test} - \text{weight before test})/\text{weight before test} \times 100 \quad (iii)$$

6. Hydrolysis Resistance

A polyurethane film having a thickness of 0.07 to 0.10 mm was formed and the film was immersed in a hot water at 100° C. for 2 weeks. Then, a mechanical property (elongation of the coated film) was measured by the method shown in the above 4. After the measurement, hydrolysis resistance was evaluated as follows: the case where the value was 80% or more of the value determined in the above 4 was marked by A, the case where the value was 60% to less than 80% was marked by B, and the case where the value was less than 60% was marked by C.

7. Weather Resistance

A polyurethane film having a thickness of 0.07 to 0.10 mm was formed and the film was placed in a sunshine type weather-o-meter (WEL-SUN-DC manufactured by Suga Test Instruments Co., Ltd.). After a predetermined time (200 hours) was passed with repeating a cycle of 60 minutes including 12 minutes of raining, a mechanical property (elongation of the coated film) was measured by the method shown in the above 4. After the measurement, weather resistance was evaluated as follows: the case where the value was 80% or more of the value determined in the above article 4 was marked by A, the case where the value was 60% to less than 80% was marked by B, and the case where the value was less than 60% was marked by C.

Example 1

Into a 2 l separable flask equipped with a stirrer, a thermometer, and an Oldershow type distillation column fitted with a vacuum jacket having a reflux head at a column top were charged 355 g of 2-methyl-1,3-propanediol, 305 g of 1,4-butanediol, and 650 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 2-methyl-1,3-propanediol, 1,4-butanediol, and ethylene carbonate in the separable flask were distilled off over a period of 1 hour. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 55.8 and a copolymerization composition of 2-methyl-1,3-propanediol/1,4-butanediol=53/47. The content of 5-methyl-1,3-dioxan-2-one in the reaction product was found to be 2.1% by weight.

Example 2

Into a 2 l separable flask equipped with a stirrer, a thermometer, and an Oldershow type distillation column fitted with a vacuum jacket having a reflux head at a column top were charged 350 g of 2-methyl-1,3-propanediol, 450 g of 1,6-hexanediol, and 660 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 1400 under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 2-methyl-1,3-propanediol, 1,6-hexanediol, and ethylene carbonate in the separable flask were distilled off over a period of 1 hour. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 56.2 and a copolymerization composition of 2-methyl-1,3-propanediol/1,6-hexanediol=51/49.

Example 3

Into a 2 l separable flask equipped with a stirrer, a thermometer, and an Oldershow type distillation column fitted with a vacuum jacket having a reflux head at a column top were charged 420 g of 2-methyl-1,3-propanediol, 260 g of 1,3-propanediol, and 720 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 2-methyl-1,3-propanediol, 1,3-propanediol, and ethylene carbonate in the separable flask were distilled off over a period of 1 hour. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 55.5 and a copolymerization composition of 2-methyl-1,3-propanediol/1,3-propanediol=58/42.

Example 4

Into a 2 l separable flask equipped with a stirrer, a thermometer, and an Oldershow type distillation column fitted with a vacuum jacket having a reflux head at a column top were charged 570 g of 2-methyl-1,3-propanediol, 110 g of 1,4-butanediol, and 660 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 2-methyl-1,3-propanediol, 1,4-butanediol, and ethylene carbonate in the separable flask were distilled off over a period of 1 hour. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 56.0 and a copolymerization composition of 2-methyl-1,3-propanediol/1,4-butanediol=84/16. The content of 5-methyl-1,3-dioxan-2-one in the reaction product was found to be 2.9% by weight.

Example 5

Into a 2 l separable flask equipped with a stirrer, a thermometer, and an Oldershow type distillation column fitted with a vacuum jacket having a reflux head at a column top were charged 500 g of 2-methyl-1,3-propanediol, 150 g of 1,4-butanediol, and 655 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 2-methyl-1,3-propanediol, 1,4-butanediol, and ethylene carbonate in the separable flask were distilled off over a period of 1 hour. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 56.1 and a copolymerization composition of 2-methyl-1,3-propanediol/1,4-butanediol=77/23. The content of 5-methyl-1,3-dioxan-2-one in the reaction product was found to be 2.8% by weight.

Example 6

Into a 2 l separable flask equipped with a stirrer, a thermometer, and an Oldershow type distillation column fitted with a vacuum jacket having a reflux head at a column top were charged 173 g of 2-methyl-1,3-propanediol, 522 g of 1,4-butanediol, and 684 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 2-methyl-1,3-propanediol, 1,4-butanediol, and ethylene carbonate in the separable flask were distilled off over a period of 1 hour. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 56.4 and a copolymerization composition of 2-methyl-1,3-propanediol/1,4-butanediol=25/75. The content of 5-methyl-1,3-dioxan-2-one in the reaction product was found to be 1.2% by weight.

Example 7

Into a 3 m³ SUS reactor fitted with a heating jacket and equipped with a stirrer and a distillation apparatus composed of a distillation column packed with a regular packing and having a packing height of 5 m and a theoretical plate number of 10 plates, a condenser, a pot, and a reflux pump were charged 941 kg of 2-methyl-1,3-propanediol, 403 kg of 1,4-butanediol, and 1315 kg of ethylene carbonate. Then, 0.13 kg of titanium teterabutoxide was added thereto as a catalyst. The atmosphere of inside of the reactor was replaced with nitrogen by repeating an operation of reducing the pressure of the reactor to 1 kPa and then introducing nitrogen to return the pressure to atmospheric pressure three times.

Heating was started by passing a heating medium having a temperature of 200 to 230° C. through the jacket and the whole was heated at an reactor inner temperature of 150° C. for 2 hours while column-top pressure was adjusted to 7 to 8 kPa. On this occasion, removal from the distillation column was not conducted.

Then, the reflux ratio of the distillation column was set at 9, the column-top pressure was adjusted to 7 to 1.5 kPa so that the amount to be removed was 45 to 50 kg/hr, and a heating medium having a temperature of 230 to 240° C. was passed through the jacket, whereby the whole was heated at a reactor inner temperature of 150° C. for 19 hours.

Thereafter, the reflux ratio of the distillation column was set at 1, the column-top pressure was adjusted to 1.5 to 0.6 kPa so that the amount to be removed was 200 to 280 kg/hr, and a heating medium having a temperature of 240° C. was passed through the jacket, whereby the whole was heated at a reactor inner temperature of 150 to 170° C. for 2 hours 30 minutes. On this occasion, the content of 5-methyl-1,3-dioxan-2-one in the reaction mixture was found to be 17.5% by weight.

Then, the column-top pressure was adjusted to 0.6 to 0.3 kPa and a heating medium having a temperature of 200° C. was passed through the jacket, whereby the whole was heated at a reactor inner temperature of 165 to 175° C. for 3 hours and 20 minutes while distilling components were all removed without using the distillation column.

Through the reaction, a viscous liquid at normal temperature was obtained. The resulting reaction product had an OH value of 58.7 and a copolymerization composition of 2-methyl-1,3-propanediol/1,4-butanediol=64/36. The content of 5-methyl-1,3-dioxan-2-one in the reaction product was found to be 2.0% by weight.

Example 8

Into a 3 m³ SUS reactor fitted with a heating jacket and equipped with a stirrer and a distillation apparatus composed of a distillation column packed with a regular packing and having a packing height of 5 m and a theoretical plate number of 10 plates, a condenser, a pot, and a reflux pump were charged 700 kg of 2-methyl-1,3-propanediol, 701 kg of 1,4-butanediol, and 1369 kg of ethylene carbonate. Then, 0.14 kg of titanium teterabutoxide was added thereto as a catalyst. The atmosphere of inside of the reactor was replaced with nitrogen by repeating an operation of reducing the pressure of the reactor to 1 kPa and then introducing nitrogen to return the pressure to atmospheric pressure three times.

Heating was started by passing a heating medium having a temperature of 200 to 230° C. through the jacket and the whole was heated at an reactor inner temperature of 150° C. for 2 hours while column-top pressure was adjusted to 7 to 8 kPa. On this occasion, removal from the distillation column was not conducted.

Then, the reflux ratio of the distillation column was set at 9, the column-top pressure was adjusted to 7 to 1.5 kPa so that the amount to be removed was 45 to 50 kg/hr, and a heating medium having a temperature of 230 to 240° C. was passed through the jacket, whereby the whole was heated at a reactor inner temperature of 150° C. for 19 hours.

Thereafter, the reflux ratio of the distillation column was set at 1, the column-top pressure was adjusted to 1.5 to 0.6 kPa so that the amount to be removed was 200 to 300 kg/hr, and a heating medium having a temperature of 240° C. was passed through the jacket, whereby the whole was heated at a reactor inner temperature of 150 to 170° C. for 3 hours 20 minutes. On this occasion, the content of 5-methyl-1,3-dioxan-2-one in the reaction mixture was found to be 6.9% by weight.

Then, the column-top pressure was adjusted to 0.6 to 0.3 kPa and a heating medium having a temperature of 200° C. was passed through the jacket, whereby the whole was heated at a reactor inner temperature of 170 to 175° C. for 160 minutes while distilling components were all removed without using the distillation column.

Through the reaction, a viscous liquid at normal temperature was obtained. The resulting reaction product had an OH value of 54.3 and a copolymerization composition of 2-methyl-1,3-propanediol/1,4-butanediol=43/57. The content of 5-methyl-1,3-dioxan-2-one in the reaction product was found to be 1.3% by weight.

Example 9

Into a 2 l separable flask equipped with a stirrer, a thermometer, and an Oldershow type distillation column fitted with a vacuum jacket having a reflux head at a column top were charged 244 g of 2-methyl-1,3-propanediol, 416 g of 1,4-butanediol, and 650 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 2-methyl-1,3-propanediol, 1,4-butanediol, and ethylene carbonate in the separable flask were distilled off over a period of 1 hour. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 54.0 and a copolymerization composition of 2-methyl-1,3-propanediol/1,4-butanediol=35/65. The content of 5-methyl-1,3-dioxan-2-one in the reaction product was found to be 1.6% by weight.

Example 10

Into a 2 l separable flask equipped with a stirrer, a thermometer, and an Oldershow type distillation column fitted with a vacuum jacket having a reflux head at a column top were charged 442 g of 2-methyl-1,3-propanediol, 263 g of 1,5-pentanediol, and 655 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 2-methyl-1,3-propanediol, 1,5-pentanediol, and ethylene carbonate in the separable flask were distilled off over a period of 1 hour. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 55.2 and a copolymerization composition of 2-methyl-1,3-propanediol/1,5-pentanediol=64/36.

Example 11

Into a 2 l separable flask equipped with a stirrer, a thermometer, and an Oldershow type distillation column fitted with a vacuum jacket having a reflux head at a column top were charged 335 g of 2-methyl-1,3-propanediol, 387 g of 1,5-pentanediol, and 655 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 2-methyl-1,3-propanediol, 1,5-pentanediol, and ethylene carbonate in the separable flask were distilled off over a period of 1 hour. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 56.0 and a copolymerization composition of 2-methyl-1,3-propanediol/1,5-pentanediol=48/52.

Example 12

Into a 2 l separable flask equipped with a stirrer, a thermometer, and an Oldershow type distillation column fitted with a vacuum jacket having a reflux head at a column top were charged 471 g of 2-methyl-1,3-propanediol, 291 g of 1,6-hexanediol, and 660 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 2-methyl-1,3-propanediol, 1,6-hexanediol, and ethylene carbonate in the separable flask were distilled off over a period of 1 hour. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 55.1 and a copolymerization composition of 2-methyl-1,3-propanediol/1,6-hexanediol=66/34.

Example 13

Into a 2 l separable flask equipped with a stirrer, a thermometer, and an Oldershow type distillation column fitted with a vacuum jacket having a reflux head at a column top were charged 256 g of 2-methyl-1,3-propanediol, 572 g of 1,6-hexanediol, and 660 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 2-methyl-1,3-propanediol, 1,6-hexanediol, and ethylene carbonate in the separable flask were distilled off over a period of 1 hour. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 56.8 and a copolymerization composition of 2-methyl-1,3-propanediol/1,6-hexanediol=36/64.

Example 14

Into a 2 l separable flask equipped with a stirrer, a thermometer, and an Oldershow type distillation column fitted with a vacuum jacket having a reflux head at a column top were charged 462 g of 2-methyl-1,3-propanediol, 198 g of 1,4-butanediol, and 650 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 2-methyl-1,3-propanediol, 1,4-butanediol, and ethylene carbonate in the separable flask were distilled off over a period of 1 hour. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 63.1 and a copolymerization composition of 2-methyl-1,3-propanediol/1,4-butanediol=68/32. The content of 5-methyl-1,3-dioxan-2-one in the reaction product was found to be 10.5% by weight.

Comparative Example 1

Into a 2 l separable flask equipped with a stirrer, a thermometer, and an Oldershow type distillation column fitted with a vacuum jacket having a reflux head at a column top were charged 780 g of 1,4-butanediol and 760 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 1,4-butanediol and ethylene carbonate in the separable flask were distilled off. Then, the setting of the oil bath was raised to 185° C. and the reaction was continued for another 4 hours while they were distilled off at a flask inner temperature of 160 to 165° C. Through the reaction, a white solid at normal temperature was obtained. The resulting reaction product had an OH value of 56.0.

Comparative Example 2

A reaction similar to the reaction in Comparative Example 1 was carried out except that 780 g of 1,4-butanediol in Comparative Example 1 was changed to 1020 g of 1,6-hexanediol. Through the reaction, a white solid at normal temperature was obtained. The resulting reaction product had an OH value of 55.5.

Comparative Example 3

Into a 2 l separable flask equipped with a stirrer, a thermometer, and an Oldershow type distillation column fitted with a vacuum jacket having a reflux head at a column top were charged 455 g of 3-methyl-1,5-pentanediol, 455 g of 1,6-hexanediol, and 700 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the Oldershow type distillation column was replaced with a simple distillation apparatus and the whole was heated on an oil bath set at 180° C. After the flask inner temperature was lowered to 140 to 150° C. and the pressure was dropped to 0.5 kPa, remaining 455 g of 3-methyl-1,5-pentanediol, 1,6-hexanediol, and ethylene carbonate in the separable flask were distilled off. Then, the setting of the oil bath was raised to 185° C. and the reaction was continued for another 4 hours while they were distilled off at a flask inner temperature of 160 to 165° C. Through the reaction, a viscous liquid at normal temperature was obtained. The resulting reaction product had an OH value of 56.3 and a copolymerization composition of 3-methyl-1,5-pentanediol/1,6-hexanediol=50/50.

Comparative Example 4

A reaction similar to the reaction in Comparative Example 3 was carried out except that 455 g of 3-methyl-1,5-pentandiol and 455 g of 1,6-hexanediol in Comparative Example 3 were changed to 520 g of 2-isopropyl-1,4-butanediol and 265 g of 1,4-butanediol, respectively. Through the reaction, a viscous liquid at normal temperature was obtained. The resulting reaction product had an OH value of 55.8 and a copolymerization composition of 2-isopropyl-1,4-butanediol/1,4-butanediol=57/43.

Comparative Example 5

A reaction similar to the reaction in Comparative Example 3 was carried out except that 455 g of 3-methyl-1,5-pentanediol in Comparative Example 3 was changed to 430 g of 1,5-pentanediol. Through the reaction, a viscous liquid at normal temperature was obtained. The resulting reaction product had an OH value of 55.8 and a copolymerization composition of 1,6-hexanediol/1,5-pentanediol=52/48.

Comparative Example 6

A reaction similar to the reaction in Comparative Example 1 was carried out except that 780 g of 1,4-butanediol in Comparative Example 1 was changed to 790 g of 2-methyl-1,3-propanediol. Through the reaction, a viscous liquid at normal temperature was obtained. The resulting reaction product had an OH value of 55.5. The content of 5-methyl-1, 3-dioxan-2-one in the reaction product was found to be 3.5% by weight.

Comparative Example 7

Into a 2 l separable flask equipped with a stirrer, a thermometer, and an Oldershow type distillation column fitted with a vacuum jacket having a reflux head at a column top were charged 380 g of 1,3-propanediol, 220 g of 1,4-butanediol, and 650 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the setting of the oil bath was raised to 180° C. and remaining 1,3-propanediol, 1,4-butanediol, and ethylene carbonate in the separable flask were distilled off over a period of 1 hour at a flask inner temperature of 140 to 150° C. under a pressure of 0.5 to 1.0 kPa while a part of distillate was removed from the reflux head at a reflux ratio of 4 using the distillation column. Then, the setting of the oil bath was raised to 185° C. and the reaction was continued for another 4 hours at a flask inner temperature of 160 to 165° C. Through the reaction, a viscous liquid at normal temperature was obtained. The resulting reaction product had an OH value of 61.9 and a copolymerization composition of 1,3-propanediol/1,4-butanediol=67/33. The content of 1,3-dioxan-2-one in the reaction product was found to be 10.8% by weight.

Comparative Example 8

Into a 2 l separable flask equipped with a stirrer, a thermometer, and an Oldershow type distillation column fitted with a vacuum jacket having a reflux head at a column top were charged 562 g of 1,3-propanediol and 650 g of ethylene carbonate. After the whole was stirred to effect dissolution at 70° C., 0.015 g of lead acetate trihydrate was added thereto as a catalyst. The whole was heated on an oil bath set at 175° C. and was reacted at a flask inner temperature of 140° C. under a pressure of 1.0 to 1.5 kPa for 12 hours while a part of distillate was removed from the reflux head at a reflux ratio of 4. Thereafter, the setting of the oil bath was raised to 180° C. and remaining 1,3-propanediol and ethylene carbonate in the separable flask were distilled off over a period of 1 hour at a flask inner temperature of 140 to 150° C. under a pressure of 0.5 to 1.0 kPa while a part of distillate was removed from the reflux head at a reflux ratio of 4 using the distillation column. Then, the setting of the oil bath was raised to 185° C. and the reaction was continued for another 4 hours at a flask inner temperature of 160 to 165° C. Through the reaction, a viscous liquid at normal temperature was obtained. The resulting reaction product had an OH value of 61.0. The content of 1,3-dioxan-2-one in the reaction product was found to be 11.1% by weight.

Using each of the polycarbonate diols obtained in Examples 1 to 14 and Comparative Examples 1 to 8, polyurethanes were prepared by the following method. Namely, 0.1 mol of the polycarbonate diol, 0.2 mol of 4,4'-diphenylmethane diisocyanate, 0.2 mol of ethylene glycol, and 600 g of dimethylformamide (DMF) were added and reacted at 80° C. for 8 hours to obtain a DMF solution of a polyurethane. The resulting DMF solution of the polyurethane was cast on a glass plate and dried to obtain a dry film. Using the film, evaluation of the physical properties thereof was conducted by the above methods. The results are shown in Table 1.

The evaluation results of hydrolysis resistance and weather resistance were both B in Example 14 but were at practically allowable level.

TABLE 1

|  | 100% Modulus (MPa) | Elongation at break (%) | Oil resistance (%) | Hydrolysis resistance | Weather resistance |
|---|---|---|---|---|---|
| Example 1 | 2.0 | 850 | 10 | A | A |
| Example 2 | 2.3 | 800 | 13 | A | A |
| Example 3 | 2.3 | 750 | 13 | A | A |
| Example 4 | 3.0 | 670 | 17 | A | A |
| Example 5 | 2.6 | 720 | 15 | A | A |
| Example 6 | 2.9 | 700 | 16 | A | A |
| Example 7 | 2.4 | 800 | 12 | A | A |
| Example 8 | 2.2 | 820 | 12 | A | A |
| Example 9 | 2.3 | 810 | 12 | A | A |
| Example 10 | 2.3 | 810 | 12 | A | A |
| Example 11 | 2.4 | 820 | 14 | A | A |
| Example 12 | 2.2 | 800 | 13 | A | A |
| Example 13 | 2.4 | 790 | 15 | A | A |
| Example 14 | 1.8 | 870 | 14 | B | B |
| Comparative Example 1 | 4.2 | 460 | 19 | B | B |

TABLE 1-continued

|  | 100% Modulus (MPa) | Elongation at break (%) | Oil resistance (%) | Hydrolysis resistance | Weather resistance |
|---|---|---|---|---|---|
| Comparative Example 2 | 3.2 | 500 | 41 | A | A |
| Comparative Example 3 | 2.4 | 700 | 50 | A | B |
| Comparative Example 4 | 3.1 | 480 | 52 | A | B |
| Comparative Example 5 | 2.5 | 610 | 38 | A | A |
| Comparative Example 6 | 5.6 | 450 | 15 | A | A |
| Comparative Example 7 | 3.0 | 590 | 35 | A | A |
| Comparative Example 8 | 4.8 | 440 | 18 | A | A |

While the invention has been described in detail and with reference to specific examples thereof, it will be apparent to one skilled in the art that various changes and modifications can be made therein without departing from the spirit and scope thereof.

The present application is based on Japanese Patent Application No. 2005-041945 filed on Feb. 18, 2005, and the contents are incorporated herein by reference.

Industrial Applicability

The polycarbonate diol of the present invention can be usefully utilized as a raw material compound for producing a polycarbonate-based polyurethane excellent in a balance of physical properties such as oil resistance, flexibility, hydrolysis resistance, and weather resistance.

The invention claimed is:

1. A polycarbonate diol comprising repeating units of formula (A) and formula (D), wherein both terminal groups are hydroxyl groups, the ratio of formula (A) to formula (D) is 77:23 to 35:65 by mol, and the polycarbonate diol has a number-average molecular weight of 300 to 10,000:

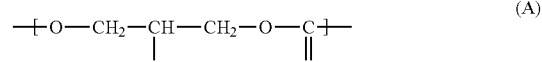

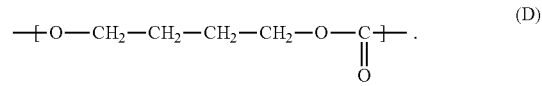

2. A thermoplastic polyurethane obtained using the polycarbonate diol according to claim 1 as a raw material.

* * * * *